United States Patent
Hirose et al.

(10) Patent No.: US 7,655,359 B2
(45) Date of Patent: Feb. 2, 2010

(54) SECONDARY BATTERY

(75) Inventors: Takakazu Hirose, Fukushima (JP);
Kenichi Kawase, Fukushima (JP);
Isamu Konishiike, Fukushima (JP);
Masayuki Iwama, Fukushima (JP);
Koichi Matsumoto, Fukushima (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 11/610,188

(22) Filed: Dec. 13, 2006

(65) Prior Publication Data

US 2007/0154806 A1 Jul. 5, 2007

(30) Foreign Application Priority Data

Dec. 16, 2005 (JP) ............................ P2005-363498

(51) Int. Cl.
*H01M 4/64* (2006.01)
(52) U.S. Cl. .................. 429/233; 429/245; 429/231.95; 429/218.1; 429/209; 429/163
(58) Field of Classification Search .................. 429/233, 429/245, 231.95, 218.1, 209, 163
See application file for complete search history.

(56) References Cited

U.S. PATENT DOCUMENTS

| 6,051,340 A | 4/2000 | Kawakami et al. |
| 6,432,579 B1 | 8/2002 | Tsuji et al. |
| 6,685,804 B1 | 2/2004 | Ikeda et al. |
| 6,887,511 B1 | 5/2005 | Shima et al. |
| 7,482,095 B2 * | 1/2009 | Takada et al. ............. 429/218.1 |
| 2001/0037557 A1 * | 11/2001 | Yoshida et al. ............. 29/623.5 |
| 2002/0102456 A1 * | 8/2002 | Aihara et al. ............... 429/144 |

FOREIGN PATENT DOCUMENTS

| EP | 1 482 581 | * 12/2004 |
| JP | 08-050922 | 2/1996 |
| JP | 11-135115 | 5/1999 |
| JP | 2948205 | 7/1999 |
| WO | 01/29912 | 4/2001 |
| WO | 01/31721 | 5/2001 |

* cited by examiner

*Primary Examiner*—Laura S Weiner
(74) *Attorney, Agent, or Firm*—Sonnenschein Nath & Rosenthal LLP

(57) ABSTRACT

A secondary battery having a feature in which a positive electrode, a negative electrode and electrolyte are provided; the negative electrode includes a negative electrode active material layer which is alloying at least at a portion of a boundary face with a negative electrode current collector; an approximately tabular electrode body structure is formed by a constitution in which a laminated body of the lamellar positive electrode and the lamellar negative electrode is wound or folded; and in the approximately tabular electrode body structure, relation of $B \leq 1.5A$ is satisfied when length in a perpendicular direction with respect to a bended portion of the laminated body is made to be A and length in a parallel direction with respect to the bended portion of the laminated body is made to be B.

6 Claims, 5 Drawing Sheets

SECONDARY BATTERY

CROSS REFERENCES TO RELATED APPLICATIONS

The present invention contains subject matter related to Japanese Patent Application JP 2005-363498 filed in the Japanese Patent Office on Dec. 16, 2005, the entire contents of which being incorporated herein by reference.

BACKGROUND OF THE INVENTION

1. Field of the Invention

The present invention relates to a secondary battery using a negative electrode in which an alloy is used for a negative electrode active material thereof.

2. Description of the Related Art

In recent years, high-capacity fabrication of a lithium ion secondary battery which is a power supply has been desired along with high-performance and multifunction fabrication of a mobile communication apparatus.

However, a lithium ion secondary battery used at the present day uses lithium cobalt oxide as positive electrode active material and graphite as negative electrode active material, and the lithium secondary battery according to these materials is used based on a capacity which is already near the theoretical capacity, so that it has become in a situation that a still higher capacity fabrication thereof is extremely difficult.

For this reason, in recent years, investigation of a high capacity negative electrode which uses silicon (Si), tin (Sn) or the like as the negative electrode active material has been carried out actively. However, when these electrodes repeat charge and discharge, the current collection ability thereof decreases, because the active materials repeat expansion and contraction drastically and are smashed and atomized. Also, decomposition of the electrolyte is accelerated along with increase of surface area of the negative electrode in which deterioration of cycle characteristic is drastic.

Consequently, apart from a method in the past which coats slurry including granulous binder or the like, there has been reviewed a method for forming negative electrode active material for the negative electrode current collector by using vapor method, liquid phase method, sintering method, spraying method or the like (for example, see Patent Document 1, Patent Document 2 and Patent Document 3). According to this method, it is possible to repress atomization as compared with the coating type electrode in the past and at the same time, it is possible to integrate the negative electrode current collector and the negative electrode active material layer, so that electron conductivity in the negative electrode becomes extremely favorable and high-performance fabrication is expected in point of capacity and also in point of cycle life.

However, even in the negative electrode in which the current collector and the active material layer are integrated in this manner, peeling of the current collector and the active material layer arising from expansion or contraction of the active material layer occurs, so that it was difficult to obtain an adequate characteristic. Consequently, for example, there was proposed a method in which components of the negative electrode current collector are diffused in the negative electrode active material layer, adhesiveness of the negative electrode current collector and the negative electrode active material layer is heighten and at the same time, expansion and contraction in the diffusion region is repressed (for example, see Patent Document 4). Also, there was proposed a method in which impurity is added in the negative electrode active material layer and inclination structure is employed by changing the impurity concentration in the thickness direction (for example, see Patent Document 5).

[Patent Document 1] Japanese unexamined publication No. H8-50922

[Patent Document 2] Japanese Patent No. 2948205

[Patent Document 3] Japanese unexamined publication No. H11-135115

[Patent Document 4] Pamphlet of PCT unexamined publication No. WO01/029912

[Patent Document 5] Pamphlet of PCT unexamined publication No. WO01/031721

SUMMARY OF THE INVENTION

However, according to the method described in the aforementioned Patent Document 4, breakdown of the negative electrode current collector is to occur if alloying of the negative electrode is drastic. Also, with respect to the alloying within the extent that breakdown of the negative electrode current collector does not occur, adhesiveness of the negative electrode current collector and the negative electrode active material is improved, but it is not possible to repress expansion or contraction of the active material in the vicinity of the negative electrode current collector in which effect of characteristic improvement in charge and discharge cycle could not be recognized.

Also, it is difficult to repress expansion or contraction of the negative electrode arising from the charge and discharge by relying upon the addition under a concentration within the extent of impurity to the negative electrode and it was difficult to improve battery characteristic such as cycle characteristic and the like.

The aforementioned problem such as the cycle characteristic and the like frequently occurs particularly in case of constituting a battery by using silicon, tin or the like for an active material, by winding a thin film shaped negative electrode which is alloyed at least at a portion of the active material and the current collector, and by laminating the thin film electrodes of wound type and the like. After the causes in which this problem occurs were investigated, the following causes were recognized.

In the negative electrode active material layer in which silicon, tin or the like is used, expansion or contraction which occurs when charging and discharging becomes drastic as compared with that of graphite which was used as the negative electrode active material in the past.

In other words, the negative electrode active material layer in which silicon and tin are used expands significantly along with the charging and further, when it is contracted along with the discharging, also the negative electrode current collector is stretched significantly, when charging, to all directions by the stress of the expansion and the contraction of the negative electrode active material and further, it is compressed when discharging.

At that time, with respect to the negative electrode active material, the volume of the negative electrode active material itself expands caused by supporting ionized lithium, and on the other hand, the negative electrode current collector is only extended by the expansion of the negative electrode active material in which there occurs no change in the volume of the negative electrode current collector itself.

With respect to the terminal portion of the negative electrode, it is possible to allow the stress to escape by making the surface area thereof to be large based on a fact that the negative electrode current collector spreads exteriorly from the terminal face. However, in the inner portion of the negative electrode, even if the surface area is attempted to be large in order to soften the stress, the negative electrode current collector cannot spread exteriorly, so that the stress is concentrated to the inner portion, the negative electrode is deformed like being squashed so as to make the surface area to be large, wrinkle shaped concavity and convexity are generated and the negative electrode is deformed. The negative electrode active material expands to all directions according to the charging, the stress occurs toward all directions also with respect to the whole negative electrode and wrinkle shaped concavity and convexity toward all directions are generated in the whole negative electrode.

With respect to the negative electrode which repeated charge and discharge, the distance of the negative electrode and the positive electrode becomes nonuniform caused by a phenomenon that the wrinkle shaped concavity and convexity are generated. At that time, in the convex portion of the negative electrode, the distance with respect to the positive electrode becomes short, so that the voltage on an occasion of the charge and discharge is concentrated therein and the electrolyte is dissolved and therefore, it happens at that portion that the battery expands, the function as a battery decreases and the like. For this reason, in the secondary battery using silicon, tin or the like for the negative electrode active material, cycle characteristic of a battery decreases.

In order to solve the above-mentioned problems, the present invention is addressed to provide a secondary battery in which it is possible by defining the outer shape of the battery to soften the generated stress applied to the negative electrode current collector when the negative electrode active material expands or contracts along with the charge and discharge and it is excellent in the cycle characteristic.

A secondary battery of the present invention has a feature in which a positive electrode, a negative electrode and electrolyte are provided; the negative electrode includes a negative electrode active material layer which is alloying at least at a portion of a boundary face with a negative electrode current collector; and an approximately tabular electrode body structure is formed by a constitution in which a laminated body of the lamellar positive electrode and the lamellar negative electrode is wound or folded. Further, in the approximately tabular electrode body structure, relation of $B \leqq 1.5A$ is satisfied when length in a perpendicular direction with respect to a bended portion of the laminated body is made to be A and length in a parallel direction with respect to the bended portion of the laminated body is made to be B.

According to the secondary battery of the present invention mentioned above, when the charging is carried out, lithium ions are extracted from the positive electrode and are inserted into the negative electrode through the electrolyte. When the discharging is carried out, lithium ions are extracted from the negative electrode and are inserted into the positive electrode through the electrolyte.

Also, in the approximately tabular electrode body structure, the distance between both the terminal faces of the electrode body structure whose laminated body is opened up exteriorly becomes relatively short by satisfying the relation of $B \leqq 1.5A$ when length in a perpendicular direction with respect to a bended portion of the laminated body is made to be A and length in a parallel direction with respect to the bended portion of the laminated body is made to be B. And therefore, the generated stress applied to the negative electrode current collector caused by the expansion and contraction of the negative electrode active material which arises from the charge and discharge can be allowed to escape to the direction of the terminal face and it is possible to attempt softening of the stress applied to the negative electrode current collector.

According to the secondary battery of the present invention, even if the active material repeats drastic expansion and contraction according to the charge and discharge, the stress generated at the negative electrode can be softened and it is possible to prevent deformation or breakdown of the negative electrode.

Accordingly, it is possible in the secondary battery of the present invention to repress decreasing of the battery capacity even in a case when the charge and discharge are repeated and it is possible to improve battery characteristic such as cycle characteristic and the like.

DESCRIPTION OF THE PREFERRED EMBODIMENTS

Prior to explanations of specific exemplified embodiments of the present invention, it will be explained with respect to an outline of the present invention.

In a battery such as a lithium secondary battery and the like, for a purpose of high capacity fabrication, for example, a positive electrode and a negative electrode which are lamellar respectively are used, a laminated body is formed between these of the positive electrode and the negative electrode through electrolyte (electrolytic solution or solid-state electrolyte) and an electrode body structure is constituted, for example, by reeling that laminated body.

As a shape of the electrode body structure, an approximately tabular shape is conceivable other than a cylindrical shape which was used generally in the past when considering about improvement of built-in convenience of battery into an apparatus or thin type fabrication of a battery.

It is possible to define the approximately tabular shape as a shape in which thickness is adequately small as compared with dimensions in the direction along the plate surface.

In order to form the electrode body structure of this approximately tabular shape, for example, a laminated body formed by a positive electrode and a negative electrode is wound and reeled and thereafter, the outer circumference surface of the wound body is compressed from the both sides thereof. Thereby, there is formed an electrode body structure of an approximately tabular shape which presents a shape being flat in a perpendicular direction with respect to the winding axis.

Figure 7:
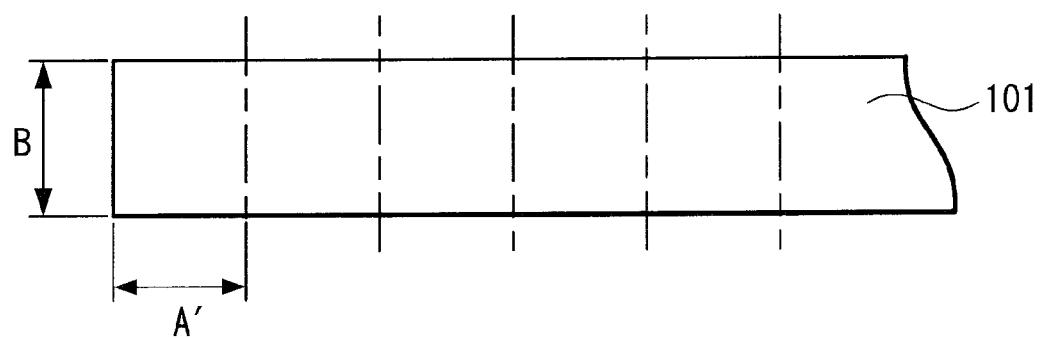
FIG. 7 is a diagram for explaining an electrode laminated body relating to the present invention.

When developing this electrode body structure, as shown in FIG. 7, a portion in the vicinity of dot-dash-lines of a laminated body 101 becomes a bended portion and other portions become approximately flat plate portions.

It should be noted practically that the distances of dot-dash-lines in FIG. 7 spread little by little from the inside portion of the electrode body structure toward the outside portion thereof caused by a fact that the laminated body 101 has thickness, but this distance change is ignored in FIG. 7, because the thickness is adequately thin as compared with the length or the width of the laminated body 101.

Meanwhile, it has been considered that high capacity fabrication can be attempted by using silicon, tin or the like for the negative electrode active material, by using a thin film shaped negative electrode in which at least a portion of the negative electrode active material is alloyed with the negative electrode current collector and by forming the laminated body 101 after laminating this negative electrode and the positive electrode.

In such a negative electrode active material layer using silicon or tin, expansion and contraction which occur on an occasion of the charge and discharge are drastic as compared with those of graphite which was used as the negative electrode active material in the past.

In other words, silicon and tin which are negative electrode active materials expand significantly along with the charging and further, contract along with the discharging. At that time, the negative electrode current collector receives stress caused by the expansion and the contraction of the volume of the negative electrode active material, but this is not to say that the negative electrode current collector itself changes in its volume according to the charge and discharge while it is extended by the expansion of the active material and is compressed by the contraction of the active material.

At that time, owing to a fact that the negative electrode current collector spreads outward from the terminal portion of the negative electrode, it is possible to increase the surface area of the negative electrode and thereby, it is possible to soften the stress applied to the negative electrode current collectors.

On the other hand, it is not possible for a portion other than the terminal portion of the negative electrode to soften the stress therein owing to the fact that the negative electrode current collector spreads exteriorly. For this reason, the stress caused by the expansion of the negative electrode active material concentrates at an inner portion (center portion) of the negative electrode, the negative electrode is deformed to the thickness direction and it happens that wrinkle shaped concavity and convexity are to be produced.

It is not possible for a deformation once generated to return to an original state even if the negative electrode active material contracts by the discharging afterward, because the negative electrode current collector itself is stretched by the stress.

In addition, the negative electrode active material expands to all directions caused by the charging, so that the stress occurs toward all directions also for the negative electrode current collector and deformation according to wrinkle shaped concavity and convexity is generated toward all directions.

With respect to the negative electrode which repeated charge and discharge, the distance of the negative electrode and the positive electrode becomes nonuniform caused by a phenomenon that the wrinkle shaped concavity and convexity are generated. At that time, in the convex portion of the negative electrode, the distance with respect to the positive electrode becomes short, so that the voltage on an occasion of the charge and discharge is concentrated therein and therefore, the electrolyte is dissolved. As a result, cycle characteristic of a battery is to decrease.

Then, in particular, in a case when an approximately tabular electrode body structure is constituted by compressing the laminated body 101 as mentioned above, it is not possible for the negative electrode current collector to spread outward at the bended portion in which the laminated body 101 is bended.

For this reason, it becomes difficult to soften the stress adequately.

Consequently, in the present invention, it is constituted by defining outer shape dimensions in an approximately tabular electrode body structure such that the stress which occurs at the negative electrode along with the charge and discharge can be allowed to escape efficiently to the outside of the negative electrode and the deformation occurring at the negative electrode is to be reduced.

Figure 1A:
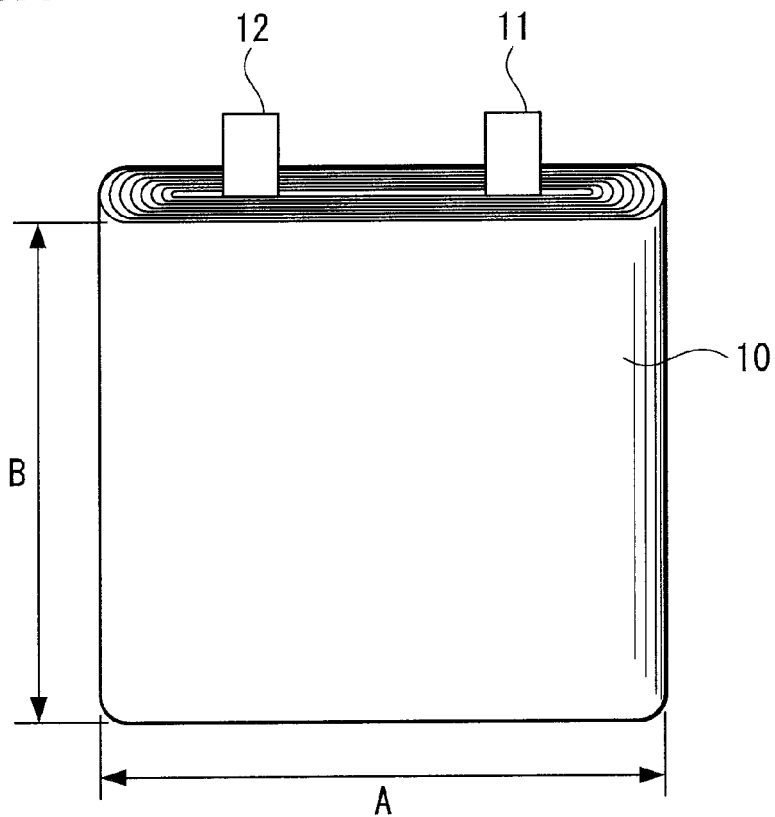
FIGS. 1A and 1B are outlined constitution diagrams of an electrode winding body which constitutes a secondary battery of one exemplified embodiment according to the present invention.
Figure 2A:
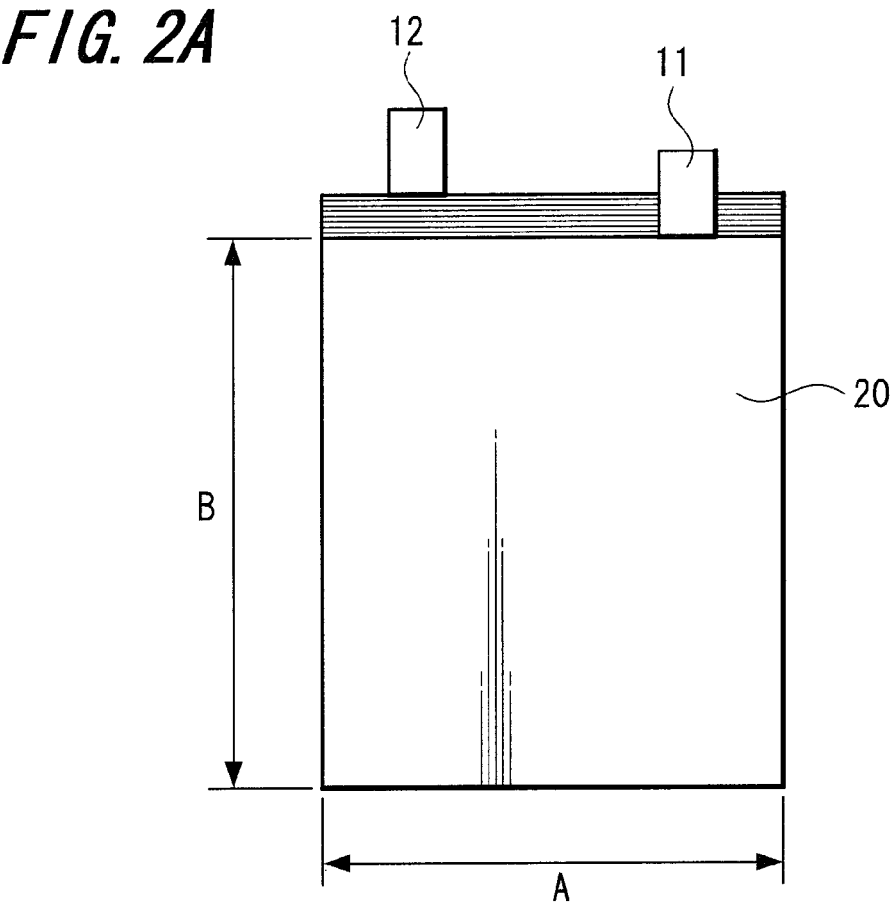
FIGS. 2A and 2B are outlined constitution diagrams of an electrode winding body which constitutes a secondary battery of another exemplified embodiment according to the present invention.

More specifically, according to the present invention, it is constituted when the dimension of a direction perpendicular to the bended portion (reeling direction of the laminated body 101) is made to be A and when the dimension (which approximately coincides with the width of the laminated body 101 in FIG. 7) of a direction parallel to the bended portion (direction parallel to the dot-dash-lines in FIG. 7) is made to be B such that B≦1.5A will be satisfied (with respect to specific positions of these outer shape dimensions A and B of the approximately tabular electrode body structure, the minute detail thereof will be explained hereinafter and see respective exemplified embodiments shown in FIG. 1A and FIG. 2A).

It should be noted that the dimension A of the direction perpendicular to the bended portion is near the distance A' of the dot-dash-lines in FIG. 7, but becomes a little bit shorter than the distance A' by that much for bending the laminated body 101.

By defining the outer shape dimensions A and B of the approximately tabular electrode body structure in this manner, the dimension B of the direction parallel to the bended portion with respect to the dimension A of the direction perpendicular to the bended portion, that is, the distance between both the terminal faces of the electrode body structure in which the laminated body 101 is opened up to the outside of the electrode body structure becomes relatively short.

Thereby, it is possible to allow the stress which is applied to the negative electrode current collector according to the expansion and contraction arising from the charge and discharge to escape to the direction of the terminal face.

It should be noted that the width of the bended portion becomes different depending on the bending degree of the laminated body 101 formed by the positive electrode and the negative electrode, but according to the present invention, the dimensions A and B of the direction along the plate surface of the approximately tabular electrode body structure are important and the width of the bended portion is not considered about particularly.

Also, instead of obtaining a state as mentioned above in which the laminated body 101 is reeled and the positive electrode and the negative electrode are wound, it is also possible to form an approximately tabular electrode body structure by obtaining a state in which the laminated body 101 is folded in so as to be folded back and a positive electrode and a negative electrode are folded up.

It is possible to form also such an electrode body structure by bending the laminated body 101 at the positions shown by the dot-dash-lines in FIG. 7, so that portions in the vicinity of the dot-dash-lines become bended portions and other portions become approximately flat plate portions. Then, an approximately tabular electrode body structure will be formed by bending and folding in the laminated body 101.

Then, by constituting also in the approximately tabular electrode body structure in which the laminated body 101 is formed by being folded-in in this manner such that B≦1.5A will be satisfied when the dimension of the direction perpendicular to the bended portion is made to be A and the dimension the direction parallel to the bended portion is made to be B, the distance between both the terminal faces of the electrode body structure becomes relatively short similarly as in a case in which the laminated body 101 is wound. And therefore, it is possible to allow the stress applied to the negative electrode current collector caused by the expansion and contraction arising from the charge and discharge to escape to the direction of the terminal face.

It should be noted in case of folding-in the laminated body 101 in this manner that the distances of the dot-dash-lines in FIG. 7 become approximately equal regardless of the thickness of the laminated body 101.

According to the present invention, by defining the outer shape dimensions A and B of the approximately tabular electrode body structure as mentioned above, the distance between both the terminal faces of the electrode body structure in which the laminated body 101 is opened up exteriorly becomes relatively short, so that it is possible to allow the stress applied to the negative electrode current collector caused by the expansion and contraction arising from the charge and discharge to escape to the direction of the terminal face and it is possible to attempt softening of the stress applied to the negative electrode current collector.

As a result, it is possible to prevent decomposition of the electrolyte by repressing deformation of the negative electrode, so that it is possible to maintain the battery capacity even if the charge and discharge are repeated and it is possible to constitute a secondary battery which is excellent for the cycle characteristic.

It should be noted that instead of bending the laminated body 101 at the positions shown by the dot-dash-lines in FIG. 7, it is also possible to make an electrode body structure having a cross section of a square shape by bending the laminated body twice with short widths, for example, 90 degree by 90 degree and in that case, there is hardly formed a bended portion, but a fact that a flat plate portion is widely formed caused by forming an approximately tabular electrode body structure is similar.

Then, it happens also in such a case in a macroscopic view that a flat plate shaped electrode body structure is to be formed by bending the laminated body and therefore, it is assumed that the present invention includes such a constitution.

It should be noted in the present invention that the shape of the terminal face of the approximately tabular electrode body structure is not limited particularly and it may be, for example, in a square shape and further it may be a shape having a curved line portion such as a track shape or the like which includes a portion of a circle on the right and left sides.

Subsequently, it will be explained with respect to specific exemplified embodiments of the present invention by using drawings.

Figure 1B:
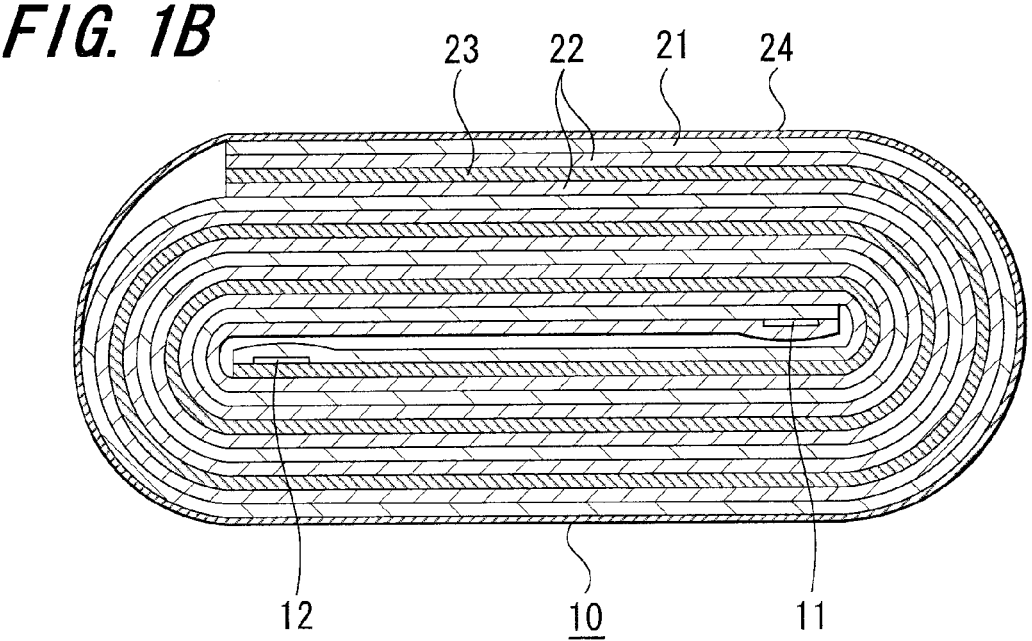

Outlined constitution diagrams of an electrode winding body 10 which constitutes a secondary battery for one exemplified embodiment of the present invention are shown in FIG. 1A and FIG. 1B. FIG. 1A shows a perspective view and FIG. 1B shows a cross section diagram.

With respect to the electrode winding body 10 shown in FIG. 1A and FIG. 1B, a laminated body is formed by piling a lamellar negative electrode 21, a separator 22 and a lamellar positive electrode 23 and it is formed by winding this laminated body in which the most outer circumferential portion thereof is protected by a protection tape 24.

Then, it is constituted owing to electrolyte which exists between the negative electrode 21 and the positive electrode 23 in the laminated body such that the negative electrode 21 and the positive electrode 23 can become conductive.

The negative electrode 21 has a negative electrode current collector and a negative electrode active material layer formed on the negative electrode current collector. The negative electrode active material layer is formed on one side or both sides of the negative electrode current collector.

It is preferable for the negative electrode current collector to be constituted by a metal material including at least one kind of metal elements which do not form compounds between lithium and metal. If a compound between lithium and metal is formed, structural breakdown occurs owing to expansion and contract along with charging and discharging, so that current collection coefficient decreases and further, ability for supporting the negative electrode active material layer disappears and the negative electrode active material will easily drop out from the negative electrode current collector.

As metal elements which do not form compounds between lithium and metal, copper (Cu), nickel (Ni), titanium (Ti), iron (Fe) and chromium (Cr) are preferable.

Further, for the negative electrode current collector, a metal element which will alloy with the negative electrode active material is preferable. In case of using tin or silicon for the negative electrode active material, the negative electrode active material layer repeats expansion and contraction largely along with the charge and discharge, so that it becomes a state in which the negative electrode active material will drop out easily from the negative electrode current collector. For this reason, by alloying a portion of the metal which forms the negative electrode current collector and the metal which forms the negative electrode active material, firm connection is realized and the drop out of the negative electrode active material can be repressed. For the metal element alloying with the negative electrode active material, copper, nickel or iron is preferable.

The negative electrode current collector may be formed by either of single layer and multilayer and in case of a multilayer structure, it is preferable to constitute the layer contacting with the negative electrode active material by a metal material such as copper, nickel, iron and the like which will alloy with the negative electrode active material. Also, it is preferable to constitute the negative electrode current collector other than the boundary face with respect to the negative electrode active material layer by a metal material composed of at least one kind of metal elements which do not form compounds between lithium and metal.

It is preferable for front surface roughness of the negative electrode current collector, more concretely, arithmetic average roughness Ra defined by JIS B0601 2001 to lie in a range from 0.2 μcm or more to 3 μm or less.

By making Ra of the front surface of the negative electrode current collector to be 0.2 μm or more, it is possible to improve anchor effect between the negative electrode current collector and the negative electrode active material layer and adhesiveness there between is improved.

Further, in a case when the negative electrode current collector includes an element alloying with the negative electrode active material, it is possible to accelerate alloying between the negative electrode current collector and the negative electrode active material layer.

For this reason, when charging and discharging are repeated, it is possible to prevent atomization according to smash of the active material and it is possible to improve cycle characteristic.

Here, when Ra of the front surface of the negative electrode current collector exceeds 3 μm, capacity retention ratio is decreases and the cycle characteristic is lowered.

It is preferable for the negative electrode active material layer to include silicon (Si) or tin (Sn) for the constituent element thereof. It is because silicon and tin have large ability for inserting and extracting lithium and high energy density can be obtained. These may be included in a form of simple substance, also may be included in a form of alloy with another metal and may be included in a form of compound with another material.

The negative electrode active material layer is formed by at least one method selected from vapor method, liquid phase method, baking method and spraying method. This is because it is possible for the negative electrode active material layer formed by these methods to repress breakdown caused by expansion and contraction arising from the charge and discharge, at the same time, because it is possible to integrate the negative electrode current collector and the negative electrode active material and because it is possible to improve electronic conductivity in the negative electrode active material. Also, binder, air gap and the like can be reduced and it is possible to make the negative electrode in a thin-film form.

The negative electrode active material is to be alloyed at least at a portion of the boundary face with respect to the negative electrode current collector. It is preferable that the constituent element of the negative electrode current collector and the constituent element of the negative electrode active material are mutually diffused at the boundary face. In the present invention, the term of alloying includes a constitution according to the diffusion of the element as mentioned above.

It is possible to manufacture this negative electrode according to the following method.

First, a negative electrode active material is deposited on a negative electrode current collector of a strip-shaped metal foil by using vapor method, liquid phase method, spraying method or the like. Alternatively, the negative electrode active material may be formed by a baking method in which powdered active material and binder are kneaded together on the negative electrode current collector and thereafter are coated on the negative electrode current collector to form a negative electrode active material layer thereon and this layer is heat-treated.

It should be noted that it is also possible to use two kinds or more of the aforementioned respective methods according to combination thereof.

For the vapor method, a physical deposition method or a chemical deposition method can be used and more specifically, a vacuum vapor deposition method, a sputtering method, an ion plating method, a laser ablation method, a CVD (Chemical Vapor Deposition) method or the like can be used.

For the liquid phase method, heretofore known technique such as electrolytic plating, electroless plating and the like can be used ぅ.

For the spraying method, a plasma spraying method, a high-speed gas flame spraying method, an arc spraying method or the like can be used.

For the baking method, heretofore known technique can be used and it is enough if only a more minute layer can be formed by heat-treating a layer which is formed by mixing an active material and a binder in a non-oxidizing atmosphere and by heightening the volume density after the heat treatment in which, for example, an atmosphere baking method, a reaction baking method or a hot press baking method can be used.

With respect to the negative electrode active material, it is possible to make at least a portion thereof to be alloyed with the negative electrode current collector when it is formed according to the aforementioned method and further, it is possible to realize the alloying by carrying out the heat treatment under a vacuum atmosphere or under a non-oxidizing atmosphere.

After the negative electrode active material layer is formed, there is also a case in which coating is formed on the front surface of the negative electrode active material layer by natural oxidation or the like, but it is possible to form the coating in accordance with its purpose if necessary.

The positive electrode 23 includes a positive electrode current collector and a positive electrode active material layer provided at the positive electrode current collector and the positive electrode active material layer is arranged so as to face to the negative electrode active material layer.

The positive electrode current collector is constituted by aluminum, nickel, stainless steel, copper or the like.

It is preferable for the positive electrode active material to be constituted by at least one kind or more of the materials which can insert and extract lithium for the positive electrode active material and it is possible, if necessary, to use a conductive material such as carbon and the like or a binder such as poly(vinylidene fluoride), styrene butadiene resin and the like.

For the positive electrode material in which lithium can be inserted and extracted, lithium included metal complex oxide which is expressed by a general formula $Li_xMIO_2$ is preferable.

By using the lithium included metal complex oxide, it is possible to heighten the voltage when discharging and further, owing to a fact that the density is high, it is possible to attempt high capacity fabrication of the secondary battery furthermore.

It should be noted that MI in the general formula is a transition metal of one kind or more and, for example, a metal of one kind or more selected from cobalt (Co), nickel (Ni) and manganese (Mn) is preferable. Also, X in the general formula becomes different dependent on the charge and discharge state of the battery and normally has a value in a range of $0.05 \leqq X \leqq 1.10$.

As the lithium included metal complex oxide, $LiCoO_2$, $LiNiO_2$ or $LiMn_2O_4$ is preferable and in addition, it is also allowed to use two kinds or more selected from these by mixing them.

It is possible to produce the positive electrode according to a procedure in which positive electrode active material, conductive material and binder are kneaded all together, they are dispersed in a dispersion medium such as N-methyl-2-pyrrolidone and the like so as to produce mixture slurry, this mixture slurry is coated on a positive electrode current collector of a strip-shaped metal foil and is dried and thereafter, a positive electrode active material layer is formed by compression molding.

The separator 22 is a layer for isolating the positive electrode and the negative electrode, for preventing short-circuiting of the current caused by a contact of both the electrodes and for allowing lithium ion to pass when charging and discharging. This separator is constituted by polyethylene or polypropylene.

The electrolyte is constituted, for example, by solvent and electrolyte salt and further may include addition agent or the like if necessary.

It is preferable for the solvent to be nonaqueous solvent such as ethylene carbonate, propylene carbonate, dimethyl carbonate, diethyl carbonate, ethyl methyl carbonate and the like and to be carbonic ester derivative in which a portion or all of hydrogen in those of compounds is substituted by halogen, and it is possible to use one kind or more therefrom. By using carbonic ester derivative including halogen which is substituted for hydrogen, it is possible to repress growth of the active material coating which occurs when the charge and discharge are repeated, so that it is possible to improve cycle characteristic.

It is preferable for the electrolyte salt to be $LiPF_6$, $LiCF_3SO_3$ or $LiClO_4$ and also, it is allowed even if two kinds or more of those are used by being mixed.

Also, the electrolyte may be constituted by gelatinous electrolyte in which electrolyte is maintained by a maintenance body. The gelatinous electrolyte can obtain high ionic conductivity and at the same time, it is possible to prevent liquid leakage of the battery or swelling thereof in high temperature. For the maintenance body for maintaining the electrolyte, it is possible to use a high polymer material such as poly(vinylidene fluoride), polyacrylonitrile, polyethylene oxide, polypropylene oxide and the like.

Leads 11 and 12 are connected with current collectors of the positive electrode and the negative electrode of the electrode winding body 10 respectively.

The leads 11 and 12 are formed by lamellar or reticulated metal material and it is possible to use aluminum, copper, nickel or stainless steel and the like for them.

As mentioned above, the electrode winding body 10 shown in FIG. 1A and FIG. 1B has a constitution wherein silicon, tin or the like is used for the negative electrode active material and a thin film shaped negative electrode in which at least a portion of the negative electrode active material is alloyed with the negative electrode current collector is laminated together with the positive electrode.

In this electrode winding body 10, the negative electrode 21 is wound closely almost without gap and it can hardly expand to the lateral direction of FIG. 1A. For this reason, when stress for expansion of the negative electrode active material is applied to the lateral direction, the stress is concentrated toward the inner portion of the negative electrode current collector and therefore, it happens that wrinkle shaped concavity and convexity are generated at the inner portion of the negative electrode 21 in order to soften the stress.

On the other hand, when stress for expansion is applied to the longitudinal direction of FIG. 1A, it is possible to soften the stress owing to a fact that the negative electrode 21 is stretched to the longitudinal direction, because there are terminal faces of the electrode winding body 10 in the longitudinal direction in which the laminated body is opened up exteriorly and there is allowance for the negative electrode 21 to be stretched.

Consequently, it is constituted in the electrode winding body 10 of this exemplified embodiment in particular such that when length in the lateral direction of the electrode winding body 10 (that is, length in the direction perpendicular to the bended portion of the laminated body) is made to be A and length in the longitudinal direction of the electrode winding body 10 (that is, length in the direction parallel to the bended portion of the laminated body) is made to be B, these of the dimensions A and B will satisfy $B \leq 1.5A$.

By employing such a constitution, the length A of the terminal face of the electrode winding body 10 becomes relatively long, so that it is possible to design the terminal face to be wide and at the same time, the length B in the longitudinal direction of the electrode winding body 10 becomes relatively short, so that distance between the terminal faces of the electrode winding body 10 becomes short.

Thereby, the negative electrode 21 is made to be easily stretched to the longitudinal direction and the stress applied to the whole negative electrode is made to be easily softened, so that it is possible to reduce deformation of the negative electrode 21.

Also, with respect to the relation of the dimensions A and B of the electrode winding body 10, the shorter the length B in the longitudinal direction is, the more easily the stress can escape, so that it is preferable for the length B in the longitudinal direction to become shorter.

Accordingly, a constitution satisfying $B \leq 1.2A$ is employed preferable.

More preferably, a constitution satisfying $B \leq 1.0A$ or a constitution satisfying $B \leq 0.8A$ is employed.

According to this exemplified embodiment mentioned above, when length in the lateral direction of the electrode winding body 10 (that is, length in the direction perpendicular to the bended portion of the laminated body) is made to be A and length in the longitudinal direction of the electrode winding body 10 (that is, length in the direction parallel to the bended portion of the laminated body) is made to be B, by employing a constitution in which these of dimensions A and B satisfy $B \leq 1.5A$, the negative electrode 21 is made to be stretched easily to the longitudinal direction, stress applied to the whole negative electrode is made to be softened easily and it is possible to reduce deformation of the negative electrode 21.

Accordingly, it is possible to repress deformation of the negative electrode 21 and to prevent decomposition of the electrolyte in a secondary battery including the electrode winding body 10, so that it is possible to maintain battery capacity even if the charge and discharge are repeated and it is possible to constitute a secondary battery excellent in cycle characteristic.

Figure 2B:
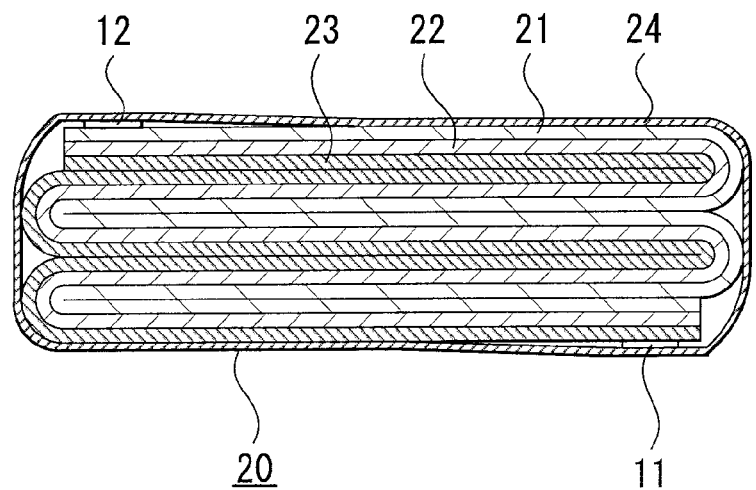

Next, as another exemplified embodiment of the present invention, outlined constitution diagrams of an electrode body structure which constitutes a secondary battery are shown in FIG. 2A and FIG. 2B. FIG. 2A shows a perspective view and FIG. 2B shows a cross section diagram.

With respect to an electrode body structure 20 shown in FIG. 2A and FIG. 2B, a laminated body is formed by piling the lamellar negative electrode 21, the separator 22 and the lamellar positive electrode 23, this laminated body is folded in after being bended and folded back to form the structure 20 and the most outer circumferential portion thereof is protected by the protection tape 24.

Then, it is constituted owing to electrolyte which exists between the negative electrode 21 and positive electrode 23 of the laminated body such that the negative electrode 21 and the positive electrode 23 can become conductive.

Also in the electrode body structure 20 of this exemplified embodiment, the outer shape dimensions A and B of the electrode body structure 20 are to be defined similarly as those of the electrode winding body 10 shown in FIG. 1.

More specifically, it is constituted such that when length in the lateral direction of the electrode structure 20 (that is, length in the direction perpendicular to the bended portion of the laminated body) is made to be A and length in the longitudinal direction of the electrode structure 20 (that is, length in the direction parallel to the bended portion of the laminated body) is made to be B, these of the dimensions A and B will satisfy $B \leq 1.5A$.

Also, with respect to the relation of the dimensions A and B of the electrode structure 20, the shorter the length B in the longitudinal direction is, the more easily the stress can escape, so that it is preferable for the length B in the longitudinal direction to become shorter.

Accordingly, a constitution satisfying $B \leq 1.2A$ is employed preferable.

More preferably, a constitution satisfying $B \leq 1.0A$ or a constitution satisfying $B \leq 0.8A$ is employed.

According to this exemplified embodiment mentioned above, when length in the lateral direction of the electrode structure 20 (that is, length in the direction perpendicular to the bended portion of the laminated body) is made to be A and length in the longitudinal direction of the electrode structure 20 (that is, length in the direction parallel to the bended portion of the laminated body) is made to be B, by employing a constitution in which these of dimensions A and B satisfy $B \leq 1.5A$, the negative electrode 21 is made to be stretched easily to the longitudinal direction, stress applied to the whole negative electrode is made to be softened easily and it is possible to reduce deformation of the negative electrode 21.

Accordingly, it is possible to repress deformation of the negative electrode 21 and to prevent decomposition of the electrolyte in a secondary battery including the electrode structure 20, so that it is possible to maintain battery capacity even if the charge and discharge are repeated and it is possible to constitute a secondary battery excellent in cycle characteristic.

It is possible for the battery of the present invention to be used, for example, for a secondary battery such as shown in below.

Figure 3:
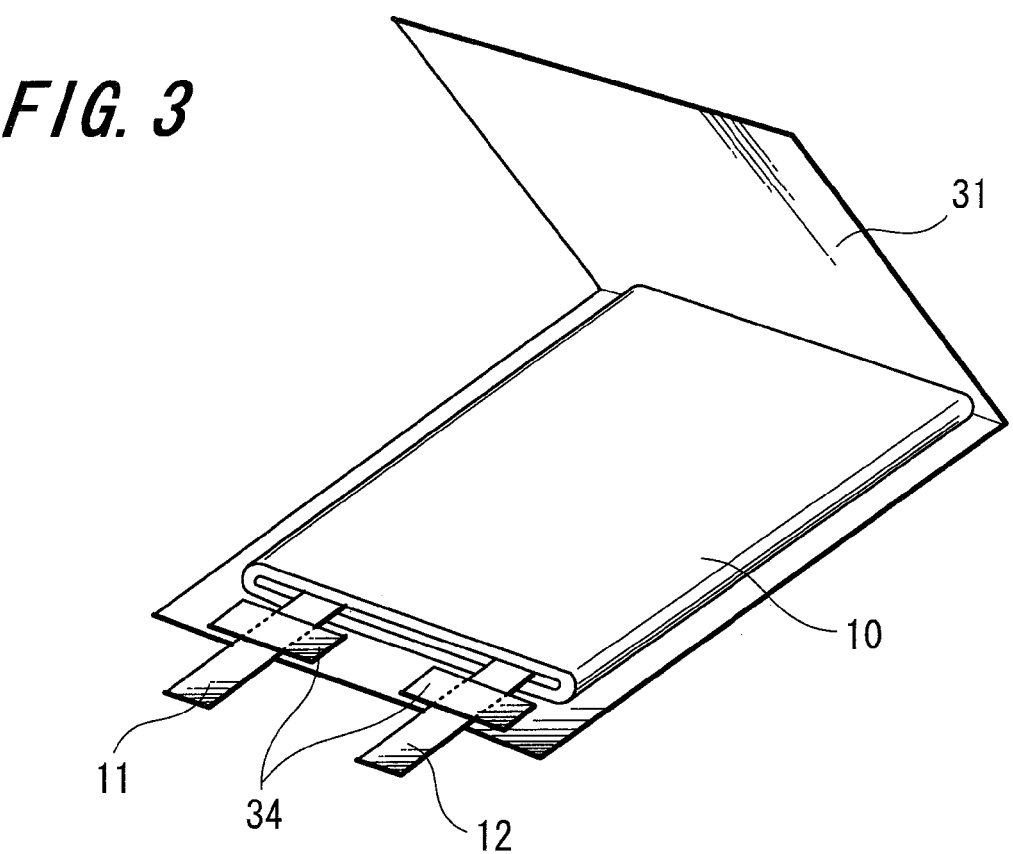
FIG. 3 is a constitution diagram of the secondary battery using the electrode winding body shown in FIG. 1A and FIG. 2B.

A constitution of a secondary battery is shown in FIG. 3. This secondary battery is a battery in which the electrode winding body 10 mounted with the leads 11 and 12 and having a constitution shown in FIG. 1A and FIG. 1B is housed in an inner portion of an exterior body 31.

The leads 11 and 12 formed by metal material having a thin film shape or a reticulated shape which is aluminum, nickel, copper, stainless steel or the like.

The exterior member 31 is constituted, for example, by a rectangle-shaped aluminum laminated film in which a nylon film, an aluminum foil and a polyethylene film are glued one another in this order. The exterior member 31 is arranged, for example, such that the polyethylene film side thereof and the electrode winding body 10 are facing to each other and the outer edge portion of the exterior member 31 is sealed by means of fusion-bonding or adhesive agent. Adherence films 34 or the like by means of material having adhesiveness like polyolefin resin such as polyethylene, polypropylene, modified polyethylene, modified polypropylene or the like are inserted between the exterior member 31 and the leads 11 and 12 for sealing the exterior member 31.

It should be noted that it is also possible for the exterior member 31 to be constituted, instead of the above-mentioned aluminum laminated film, by a laminated film having another construction, a polymeric film of polypropylene etc. or a metal film.

In addition, it is possible for the exterior member 31 to use also an iron can or an aluminum can instead of the aforementioned film-shaped container.

It is possible to manufacture this secondary battery, for example, as will be described hereinafter.

First, electrolyte in which electrolytic solution is maintained by a maintenance body is coated on the positive electrode and the negative electrode respectively and electrolyte layers are formed. Next, leads are welded on a terminal portion of the negative electrode current collector and on a terminal portion of the positive electrode current collector respectively. Next, the negative electrode and the positive electrode formed with the electrolyte layer are laminated through a separator and an electrode laminated body is formed. Next, the electrode laminated body is housed in an exterior member and thereafter, the exterior member is sealed by heat-seal, welding or the like and it is possible to manufacture a secondary battery.

Also, it is also possible to form an electrode winding body in which an electrode laminated body is formed by making the aforementioned negative electrode and positive electrode as strip-shaped thin films, by winding or folding the electrode laminated body in a longitudinal direction and by bonding a protection tape or the like at the most outer circumferential portion.

EXAMPLE

Hereinafter, the present invention will be explained according to a example.

(Positive Electrode)

Lithium cobalt oxide powder of average grain diameter 5 μm, carbon black as a conductive material and poly(vinylidene fluoride) as a binder are mixed by weight ratio of lithium cobalt oxide:carbon black:poly(vinylidene fluoride) =92:3:5 and these are injected to N-methyl-2-pyrrolidone which is a dispersion medium so as to obtain mixture slurry. Thereafter, this mixture slurry is coated on the positive electrode current collector which is formed by an aluminum foil having thickness 15 μm, is dried and is pressurized so as to form a positive electrode active material layer and a positive electrode was formed.

(Negative Electrode 1)

On the negative electrode current collector formed by a copper foil which has a rough-processed front surface of thickness 12 μm, a negative electrode active material layer including silicon was formed by an electron beam evaporation method. At that time, a negative electrode active material layer was film-made by film-making speed of 0.5 to 5 nm/sec in an atmosphere of $1 \times 10^{-2}$ Pa or less based on an electron beam heating method in which silicon target is used for an evaporation source and a negative electrode 1 was produced.

(Negative Electrode 2)

Cobalt-tin alloy having atomicity ratio of 20:80 was produced by means of a gas atomizing method and thereafter, a powdered cobalt-tin alloy of 15 μm was obtained by smashing and classifying the alloy. 75 weight % of this alloy, 20 weight % of scale-like graphite as a conductive agent and a negative electrode active material, 2 weight % of carboxymethylcellulose as a thickening agent and 3 weight % of styrene-butadiene rubber as a binding agent were mixed and dispersed in purified water as a dispersion medium so as to obtain a slurry form thereof. This slurry formed active material was coated on a negative electrode current collector formed by a copper foil which has a rough-processed front surface of thickness 12 μm, was dried and thereafter, a negative electrode 2 was produced by means of compression molding using roll press equipment.

(Negative Electrode 3)

Silicon powder having average grain diameter of 6 μm and poly(vinylidene fluoride) are mixed by weight ratio of 9:1 and N-methyl-2-pyrrolidone was added thereto so as to obtain a slurry form thereof. Negative electrode active material of this slurry form was coated on a negative electrode current collector formed by a copper foil which has a rough-processed front surface of thickness 12 μm, was milled and thereafter, was heated for 12 hours by 220° C. in a vacuum atmosphere and a negative electrode 3 was produced after producing a burned substance.

(Negative Electrode 4)

As for the negative electrode active material, 87 weight % of mesophase carbon microbead, 3 weight % of graphite and 10 weight % of poly(vinylidene fluoride) as a binding agent were mixed and N-methyl-2-pyrrolidone was added thereto so as to obtain a slurry form thereof. Negative electrode active material of this slurry form was coated on a negative electrode current collector formed by a copper foil which has a rough-processed front surface of thickness 12 μm, was milled and thereafter, was heated for 12 hours by 220° C. in a vacuum atmosphere and a negative electrode 4 was produced after producing a burned substance.

(Electrolyte)

10 weight % of poly(vinylidene fluoride) which is a block copolymer having 600,000 molecular weight of weight average and 60 weight % of dimethyl carbonate are mixed and dissolved into 30 weight % of electrolytic solution which is composed of 37.5 weight % of ethylene carbonate, 37.5 weight % of propylene carbonate, 10 weight % of vinylene carbonate and 15 weight % of $LiPF_6$ so as to produce electrolyte.

(Electrode Winding Body and Battery)

The electrolyte was coated on the positive electrode and the negative electrode and was maintained by being untreated for 8 hours at normal temperature so as to volatilize dimethyl carbonate and thereby an electrolyte layer was formed.

Thereafter, the negative electrode and the positive electrode which were formed with the electrolyte layer are laminated through a separator and a strip-shaped laminated body was produced.

Subsequently, the strip-shaped laminated body was reeled by being wound in a longitudinal direction thereof and thereafter, an electrode winding body was produced by compressing the outer circumference surface of the wound body from the both sides thereof.

Figure 4:
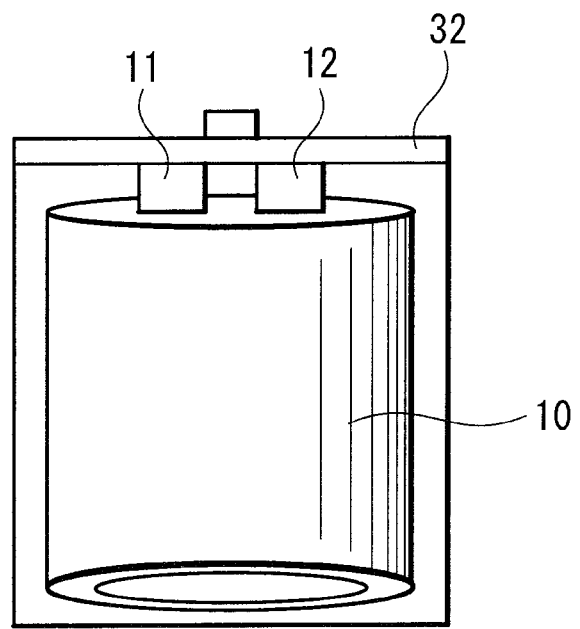
FIG. 4 is a constitution diagram of one exemplified embodiment of a secondary battery according to the present invention.

Further, as shown in FIG. 4, the electrode winding body 10 was inserted into an exterior member 32 and encapsulated therein.

As described above, a secondary battery having a constitution shown in FIG. 4 was produced.

It should be noted in the electrode winding body of the produced secondary battery that the length in the lateral direction (more specifically, length in the direction perpendicular to the bended portion of the laminated body) A and the length in the longitudinal direction (more specifically, length in the direction parallel to the bended portion of the laminated body) B are defined similarly as the electrode winding body 10 in FIG. 1A, respectively.

(Charge and Discharge Testing)

Charge and discharge testing was carried out with respect to the produced secondary battery under a condition of 25° C.

Capacity retention ratio was found by discharge capacity at the thirty first cycle with respect to that at the second cycle. At that time, only with respect to the charge and discharge at the first cycle, the charge thereof was carried out by a constant current density of 0.2 mA/cm² until the battery voltage reached 4.2V and thereafter it was carried out by the constant voltage of 4.2V until the current density reached 0.05 mA/cm², and the discharge thereof was carried out by a constant current density of 0.2 mA/cm² until the battery voltage reached 2.5V. With respect to the second cycle and thereafter, the charge thereof was carried out by a constant current density of 1 mA/cm² until the battery voltage reached 4.2V and thereafter it was carried out by the constant voltage of 4.2V until the current density reached 0.05 mA/cm², and the discharge thereof was carried out by a constant current density of 1 mA/cm² until the battery voltage reached 2.5V. Here, it was constituted when the charge is carried out such that utilization factor of the negative electrode capacity was made to be 85% and metal lithium was not to be separated out in the negative electrode.

The capacity retention ratio was calculated by a ratio of the discharge capacity at the thirty first cycle with respect to the discharge capacity at the second cycle, that is, by (discharge capacity at 31st cycle/discharge capacity at 2nd cycle)×100.

Examples 1 to 15 and Comparative Examples 1, 2

Above-mentioned negative electrode 1 was used for a negative electrode, an electrode winding body was produced by changing the relation between the length A in the lateral direction and the length B in the longitudinal direction such as shown in a table 1, and a secondary battery was produced by inserting and encapsulating the electrode winding body in an exterior member composed of an aluminum laminated film in which respective examples were made to be examples 1 to 15 and comparative examples 1, 2.

Capacity retention ratios were found with respect to the produced batteries according to the examples 1 to 15 and the comparative examples 1, 2 by means of the aforementioned method and the result thereof is shown in the table 1.

TABLE 1

|  | Relation of A and B | Capacity Retention Ratio (%) |
| --- | --- | --- |
| Example 1 | B = 1.5A | 82.0 |
| Example 2 | B = 1.4A | 85.0 |
| Example 3 | B = 1.3A | 88.0 |
| Example 4 | B = 1.2A | 90.0 |
| Example 5 | B = 1.1A | 91.0 |
| Example 6 | B = 1.0A | 92.0 |
| Example 7 | B = 0.9A | 92.1 |
| Example 8 | B = 0.8A | 93.1 |
| Example 9 | B = 0.7A | 93.0 |
| Example 10 | B = 0.6A | 92.9 |
| Example 11 | B = 0.5A | 93.1 |
| Example 12 | B = 0.4A | 92.5 |
| Example 13 | B = 0.3A | 92.6 |
| Example 14 | B = 0.2A | 92.4 |
| Example 15 | B = 0.1A | 92.3 |
| Comparative Example 1 | B = 2.0A | 65.0 |
| Comparative Example 2 | B = 1.7A | 78.0 |

As shown in the table 1, it can be comprehended that high capacity retention ratios were obtained and cycle characteristics were improved by making the relation between the length A in the lateral direction and the length B in the longitudinal direction to be B≦1.5A. Also, the shorter B becomes in stepwise from B=1.5A to B=1.2A, to B=1.0A and to B=0.8A, the higher capacity retention ratios can be obtained in which the cycle characteristics thereof are improved. Further, it can be comprehended that a high capacity retention ratio can be obtained even if the electrode is made to be short in its longitudinal direction by an amount of B=0.1A.

Examples 16, 17 and Comparative Example 3

Above-mentioned negative electrode 1 was used for a negative electrode, an electrode winding body was produced by changing the relation between the length A in the lateral direction and the length B in the longitudinal direction such as shown in a table 2, and a secondary battery was produced by encapsulating the electrode winding body in an exterior member composed of an aluminum can instead of the aluminum laminated film in which respective examples were made to be examples 16, 17 and a comparative example 3.

Capacity retention ratios were found with respect to the produced batteries according to the examples 16, 17 and the comparative example 3 by means of the aforementioned method and the result thereof is shown in the table 2.

Examples 18 to 20 and Comparative Example 4

Above-mentioned negative electrode 1 was used for a negative electrode, an electrode winding body was produced by changing the relation between the length A in the lateral direction and the length B in the longitudinal direction such as shown in a table 2, and a secondary battery was produced by encapsulating the electrode winding body in an exterior member composed of an iron can instead of the aluminum laminated film in which respective examples were made to be examples 18 to 20 and a comparative example 4.

Capacity retention ratios were found with respect to the produced batteries according to the examples 18 to 20 and the comparative example 4 by means of the aforementioned method and the result thereof is shown in the table 2.

TABLE 2

|  | Relation of A and B | Exterior Member | Capacity Retention Ratio (%) |
|---|---|---|---|
| Example 16 | B = 0.7A | Aluminum Can | 93.4 |
| Example 17 | B = 1.0A | Aluminum Can | 92.4 |
| Example 18 | B = 0.7A | Iron Can | 94.8 |
| Example 19 | B = 1.0A | Iron Can | 93.4 |
| Example 20 | B = 1.2A | Iron Can | 91.5 |
| Comparative Example 3 | B = 2.0A | Aluminum Can | 65.2 |
| Comparative Example 4 | B = 2.0A | Iron Can | 65.3 |

As shown in the table 2, even in a case when the exterior member is made to be an aluminum can or an iron can, it can be comprehended that high capacity retention ratios were obtained and cycle characteristics were improved by making the relation between the length A in the lateral direction and the length B in the longitudinal direction for the electrode to be B≦1.5A.

Examples 21 to 23 and Comparative Examples 5, 6

Above-mentioned negative electrode 2 was used for a negative electrode, an electrode winding body was produced by changing the relation between the length A in the lateral direction and the length B in the longitudinal direction such as shown in a table 3, and a secondary battery was produced by inserting and encapsulating the electrode winding body in an exterior member composed of an aluminum laminated film in which respective examples were made to be examples 21 to 23 and comparative examples 5, 6.

Capacity retention ratios were found with respect to the produced batteries according to the examples 21 to 23 and the comparative examples 5, 6 by means of the aforementioned method and the result thereof is shown in the table 3.

Examples 25, 26

Above-mentioned negative electrode 3 was used for a negative electrode, an electrode winding body was produced by changing the relation between the length A in the lateral direction and the length B in the longitudinal direction such as shown in a table 3, and a secondary battery was produced by inserting and encapsulating the electrode winding body in an exterior member composed of an aluminum laminated film in which respective examples were made to be examples 25, 26.

Capacity retention ratios were found with respect to the produced batteries according to the examples 25, 26 by means of the aforementioned method and the result thereof is shown in the table 3.

Comparative Examples 7 to 9

Above-mentioned negative electrode 4 was used for a negative electrode, an electrode winding body was produced by changing the relation between the length A in the lateral direction and the length B in the longitudinal direction such as shown in a table 3, and a secondary battery was produced by inserting and encapsulating the electrode winding body in an exterior member composed of an aluminum laminated film in which respective examples were made to be comparative examples 7 to 9.

Capacity retention ratios were found with respect to the produced batteries according to the comparative examples 7 to 9 by means of the aforementioned method and the result thereof is shown in the table 3.

TABLE 3

|  | Relation of A and B | Negative Electrode | Capacity Retention Ratio (%) |
|---|---|---|---|
| Example 21 | B = 1.3A | N. electrode 2 | 81.0 |
| Example 22 | B = 0.9A | N. electrode 2 | 82.0 |
| Example 23 | B = 0.7A | N. electrode 2 | 84.0 |
| Example 24 | B = 1.3A | N. electrode 3 | 81.0 |
| Example 25 | B = 0.9A | N. electrode 3 | 82.0 |
| Example 26 | B = 0.7A | N. electrode 3 | 83.0 |
| Comparative Example 5 | B = 2.0A | N. electrode 2 | 60.0 |
| Comparative Example 6 | B = 1.8A | N. electrode 2 | 71.0 |
| Comparative Example 7 | B = 2.0A | N. electrode 4 | 80.1 |
| Comparative Example 8 | B = 1.5A | N. electrode 4 | 80.0 |
| Comparative Example 9 | B = 0.8A | N. electrode 4 | 80.2 |

As shown in the table 3, even in a case when the negative electrode is changed from the negative electrode 1 to the negative electrode 2 or the negative electrode 3, it can be comprehended that high capacity retention ratios were obtained and cycle characteristics were improved for the negative electrode in which the negative electrode current collector and the negative electrode active material are alloyed by making the relation between the length A in the lateral direction and the length B in the longitudinal direction to be B≦1.5A.

Also, in the negative electrode 4, mesophase carbon microbead and graphite are used for the negative electrode active material, so that no change appeared in the capacity retention ratio even if the relation between the length A in the lateral direction and the length B in the longitudinal direction was changed, because the negative electrode current collector and the negative electrode active material are not alloyed.

Examples 27 to 32

The relation between the length A in the lateral direction and the length B in the longitudinal direction was made to be B=1.0A, an electrode winding body was produced similarly as the examples 1, and this electrode winding body was encapsulated in the exterior member 32 which was composed of an aluminum laminated film so as to produce a secondary battery. By changing the shapes of the exterior member 32 when seen from the upper side of the drawing at that time respectively as shown in FIGS. 5A to 5E, they were made to be examples 27 to 32 respectively.

Capacity retention ratios were found with respect to the produced batteries according to the examples 27 to 32 by means of the aforementioned method and the result thereof is shown in the table 4.

Comparative Examples 10 to 15

The relation between the length A in the lateral direction and the length B in the longitudinal direction was made to be B=2.0A, an electrode winding body was produced similarly as the examples 1, and this electrode winding body was encapsulated in the exterior member 32 which was composed of an aluminum laminated film so as to produce a secondary battery. By changing the shapes of the exterior member 32 when seen from the upper side of the drawing at that time respectively as shown in FIGS. 5A to 5E, they were made to be comparative examples 10 to 15 respectively.

Capacity retention ratios were found with respect to the produced batteries according to the comparative examples 10 to 15 by means of the aforementioned method and the result thereof is shown in the table 4.

TABLE 4

Figure 5A:
FIGS. 5A through 5F are diagrams showing shapes seeing the secondary battery of FIG. 4 from the upper side of the drawing thereof.
Figure 5B:
Figure 5C:
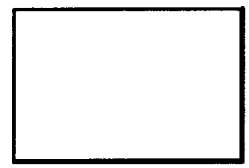
Figure 5D:
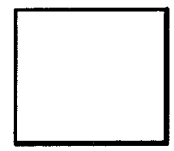
Figure 5E:
Figure 5F:
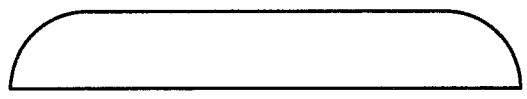

|  | Relation of A and B | Exterior | Capacity Retention Ratio (%) |
|---|---|---|---|
| Example 27 | B = 1.0A | FIG. 5A | 91.0 |
| Example 28 | B = 1.0A | FIG. 5B | 91.2 |
| Example 29 | B = 1.0A | FIG. 5C | 91.1 |
| Example 30 | B = 1.0A | FIG. 5D | 91.6 |
| Example 31 | B = 1.0A | FIG. 5E | 91.2 |
| Example 32 | B = 1.0A | FIG. 5F | 91.1 |
| Comparative Example 10 | B = 2.0A | FIG. 5A | 64.0 |
| Comparative Example 11 | B = 2.0A | FIG. 5B | 64.5 |
| Comparative Example 12 | B = 2.0A | FIG. 5C | 65.1 |
| Comparative Example 13 | B = 2.0A | FIG. 5D | 65.2 |
| Comparative Example 14 | B = 2.0A | FIG. 5E | 65.4 |
| Comparative Example 15 | B = 2.0A | FIG. 5F | 65.3 |

As shown in the table 4, even if the shape of the exterior member is changed to a whatsoever shape, it can be comprehended that high capacity retention ratios were obtained and cycle characteristics were improved by making the relation between the length A in the lateral direction and the length B in the longitudinal direction to be B≦1.5A.

Examples 33 to 35, Comparative Examples 16 to 18

Figure 6:
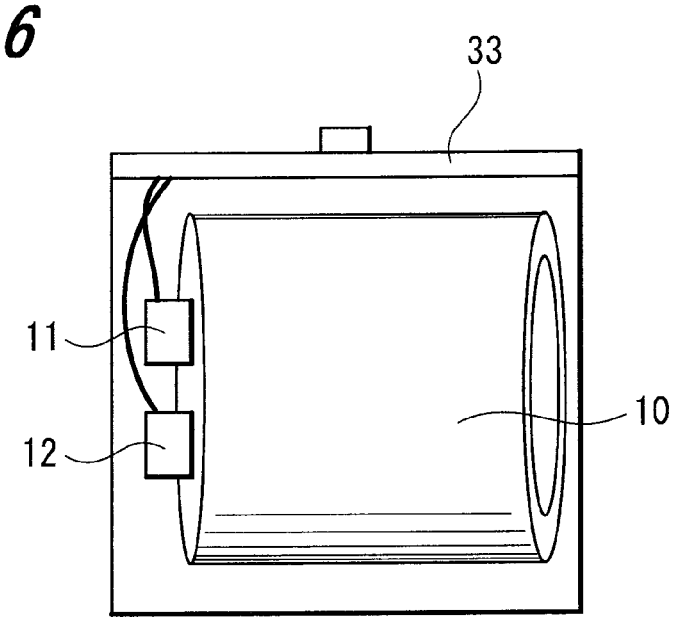
FIG. 6 is a constitution diagram of another exemplified embodiment of a secondary battery according to the present invention.

The electrode winding bodies 10 were produced by changing the relation between the length A in the lateral direction and the length B in the longitudinal direction and the exterior member 32 as shown in the table 5 and further, the secondary batteries were produced by encapsulating the electrode winding bodies 10 sideways with respect to an exterior member 33 as shown in FIG. 6 in which they were made to be examples 33 to 35 and comparative examples 16 to 18 respectively.

Capacity retention ratios were found with respect to the produced batteries according to the examples 33 to 35 and the comparative examples 16 to 18 by means of the aforementioned method and the result thereof is shown in the table 5.

TABLE 5

|  | Relation of A and B | Exterior Member | Capacity Retention Ratio (%) |
|---|---|---|---|
| Example 33 | B = 0.7A | Al-laminated Film | 93.0 |
| Example 34 | B = 1.0A | Aluminum Can | 92.2 |
| Example 35 | B = 1.1A | Iron Can | 91.7 |
| Comparative Example 16 | B = 2.0A | Al-laminated Film | 64.0 |
| Comparative Example 17 | B = 2.0A | Aluminum Can | 65.1 |
| Comparative Example 18 | B = 2.0A | Iron Can | 66.5 |

As shown in the table 5, even in case of changing the direction of the electrode winding body 10 which is encapsulated in the exterior member 33, it can be comprehended that high capacity retention ratios were obtained and cycle characteristics were improved by making the relation between the length A in the lateral direction and the length B in the longitudinal direction to be B≦1.5A.

Examples 36 to 39

Electrode winding bodies were produced by using negative electrodes in which the front surface roughness Ra of the negative electrode current collector of the above-mentioned negative electrode 1 was changed as shown in a table 6 and by making the relation between the length A in the lateral direction and the length B in the longitudinal direction to be B=1.1A and secondary batteries were produced by encapsulating the electrode winding bodies in an exterior member composed of an aluminum laminated film wherein they were made to be examples 36 to 39 respectively.

Capacity retention ratios were found with respect to the produced batteries according to the examples 36 to 39 by means of the aforementioned method and the result thereof is shown in the table 6.

TABLE 6

|  | Relation of A and B | Ra (μm) | Capacity Retention Ratio (%) |
|---|---|---|---|
| Example 36 | B = 1.1A | 0.1 | 90.1 |
| Example 37 | B = 1.1A | 0.2 | 92.8 |
| Example 38 | B = 1.1A | 0.4 | 92.6 |
| Example 39 | B = 1.1A | 0.5 | 92.1 |

As shown in the table 6, high capacity retention ratios could be obtained by making the relation between the length A in the lateral direction and the length B in the longitudinal direction to be in a range of B≦1.5A and by making the front surface roughness Ra of the negative electrode current collector to be large. In particular, it can be comprehended that high capacity retention ratios were obtained and cycle characteristics were improved by making Ra to be 0.2 μm or more.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery including:
a positive electrode;
a negative electrode; and
an electrolyte, wherein, said negative electrode includes a negative electrode active material layer which is alloyed at least at a portion of a boundary face with a negative electrode current collector, a tabular electrode body structure is formed such that a laminated body of said positive electrode and said negative electrode is wound or folded, and in said tabular electrode body structure, relation of $B \leqq 1.5A$ is satisfied when length in a perpendicular direction with respect to a bended portion of said laminated body is made to be A and length in a parallel direction with respect to the bended portion of said laminated body is made to be B.

2. A secondary battery according to claim 1, wherein said electrode body structure is housed in an exterior material formed by any one of a laminated film, an aluminum can or an iron can.

3. A secondary battery according to claim 1, wherein said negative electrode active material layer includes at least one kind or more selected from the group consisting of a) a substance, b) an alloy and c) a compound of silicon (Si) or tin (Sn).

4. A secondary battery according to claim 1, wherein said negative electrode is formed with said negative electrode active material layer deposited on said negative electrode current collector by using at least one method selected from the group consisting of a vapor method, a liquid phase method, a sintering method and a spraying method.

5. A secondary battery according to claim 1, wherein arithmetic average roughness Ra on a front surface of said negative electrode current collector is equal to or more than 0.2 μm and equal to or less than 3 μm.

6. A secondary battery including:

a positive electrode;

a negative electrode; and an electrolyte, wherein, said negative electrode includes a negative electrode active material layer which is alloyed at least at a portion of a boundary face with a negative electrode current collector, a tabular electrode body structure is formed such that a laminated body of said positive electrode and said negative electrode is wound or folded, in said tabular electrode body structure, relation of $B \leqq 1.5A$ is satisfied when length in a perpendicular direction with respect to a bended portion of said laminated body is made to be A and length in a parallel direction with respect to the bended portion of said laminated body is made to be B, and arithmetic average roughness Ra on a front surface of said negative electrode current collector is equal to or more than 0.2 μm and equal to or less than 3 μm.

* * * * *